(12) United States Patent
Gasser et al.

(10) Patent No.: US 11,764,641 B2
(45) Date of Patent: Sep. 19, 2023

(54) TERMINAL BOX ASSEMBLY FOR AN ELECTRIC MOTOR ASSEMBLY

(71) Applicant: Regal Beloit America, Inc., Beloit, WI (US)

(72) Inventors: Patrick Gasser, Washington, WI (US); Lawrence Trunec, Pewaukee, WI (US)

(73) Assignee: Regal Beloit America, Inc., Beloit, WI (US)

( * ) Notice: Subject to any disclaimer, the term of this patent is extended or adjusted under 35 U.S.C. 154(b) by 279 days.

(21) Appl. No.: 17/098,022

(22) Filed: Nov. 13, 2020

(65) Prior Publication Data

US 2022/0158525 A1 May 19, 2022
US 2023/0148460 A9 May 11, 2023

(51) Int. Cl.
*H02K 5/22* (2006.01)
*H02K 5/10* (2006.01)

(52) U.S. Cl.
CPC .............. *H02K 5/225* (2013.01); *H02K 5/10* (2013.01)

(58) Field of Classification Search
CPC ............. H02K 5/10; H02K 5/22; H02K 5/225
See application file for complete search history.

(56) References Cited

U.S. PATENT DOCUMENTS

| | | | |
|---|---|---|---|
| 4,720,157 A | 1/1988 | Nestor et al. | |
| 5,223,671 A * | 6/1993 | Alfieri | F16K 31/05 |
| | | | 74/606 R |
| 5,801,465 A | 9/1998 | Kamada | |
| 6,608,414 B1 * | 8/2003 | Conley | H02K 5/225 |
| | | | 310/43 |
| 7,722,372 B2 | 5/2010 | Matsumoto et al. | |
| 9,343,941 B2 | 5/2016 | Okamoto et al. | |
| 2004/0012276 A1 * | 1/2004 | Okamoto | H02K 5/225 |
| | | | 310/71 |
| 2004/0253124 A1 | 12/2004 | Ioi et al. | |

(Continued)

FOREIGN PATENT DOCUMENTS

| | | | | |
|---|---|---|---|---|
| CN | 101807828 A | * | 8/2010 | ............. H02K 5/225 |
| EP | 2988399 A2 | * | 2/2016 | ............... H02K 5/00 |
| JP | 58212339 A | * | 12/1983 | ............. H02K 5/225 |

OTHER PUBLICATIONS

Handwerker, Machine Translation of CN101807828,Aug. 2010 (Year: 2010).*
ITO, Machine Translation of JP58212339,Dec. 1983 (Year: 1983).*

*Primary Examiner* — Eric Johnson
(74) *Attorney, Agent, or Firm* — Armstrong Teasdale LLP

(57) ABSTRACT

A terminal box assembly for use with an electric motor assembly having a housing includes an annular adaptor fixedly coupled to the housing, a mounting hub extending from the housing and positioned within the adaptor, and an annular terminal box rotatably coupled to the adaptor. The terminal box includes a baseplate having a central opening defined therein and configured to receive the mounting hub therethrough. The terminal box assembly also includes a mounting bracket coupled to the mounting hub and positioned within the terminal box such that the baseplate is positioned between the mounting bracket and the adaptor. At least one fastener is inserted through an opening in the mounting bracket and is configured to selectively engage the base plate to compress the terminal box and the adaptor together.

20 Claims, 6 Drawing Sheets

(56) References Cited

U.S. PATENT DOCUMENTS

2009/0322169 A1* 12/2009 Moody ................. H02K 5/225
                                                                         277/650
2014/0265682 A1* 9/2014 Nair ....................... H02K 5/136
                                                                         310/88

* cited by examiner

TERMINAL BOX ASSEMBLY FOR AN ELECTRIC MOTOR ASSEMBLY

BACKGROUND

The field of the disclosure relates generally to an electric motor assembly having a terminal box assembly, and more particularly, to a terminal box assembly that reduces or prevents the accumulation of debris where the terminal box assembly connects to the motor housing while allowing for the mounting of the terminal box in multiple orientations.

At least some known electric motor assemblies include a junction box or terminal box coupled to housing of the electric motor assembly. The terminal box serves as a place to house the connections made to power from the motor leads to the incoming power leads. Traditionally, a terminal box is designed so that it can be mounted in several orientations by the installer by removing fasteners, dismounting the junction box, and re-installing in a new orientation. However, this design inherently leads to debris collecting features in the design which is disadvantageous in the end use, especially in industries such as the food industry. Specifically, At least some known electric motor assemblies mount the terminal box to a stainless steel adaptor, which leaves a gap between the terminal box and stainless steel housing. This gap is an area where contaminants can reside.

One known approach is to fully weld the terminal box to the housing to prevent forming a gap therebetween. However, in such a situation, the terminal box is no longer rotatable relative to the housing and the conduit engagement hole is permanently located in a single fixed location. As such, the terminal box cannot be manipulated into various orientations with respect to the motor housing.

BRIEF DESCRIPTION

In one embodiment, a terminal box assembly for use with an electric motor assembly having a housing is provided. The terminal box assembly includes an annular adaptor fixedly coupled to the housing, a mounting hub extending from the housing and positioned within the adaptor, and an annular terminal box rotatably coupled to the adaptor. The terminal box includes a baseplate having a central opening defined therein and configured to receive the mounting hub therethrough. The terminal box assembly also includes a mounting bracket coupled to the mounting hub and positioned within the terminal box such that the baseplate is positioned between the mounting bracket and the adaptor. At least one fastener is inserted through an opening in the mounting bracket and is configured to selectively engage the base plate to compress the terminal box and the adaptor together.

In another embodiment, a method of assembling a terminal box assembly for use with an electric motor assembly having a housing is provided. The method includes fixedly coupling an annular adaptor to the housing around a mounting hub that extends from the housing and is positioned within the adaptor, and rotatably coupling an annular terminal box to the adaptor. The terminal box includes a baseplate having a central opening defined therein and configured to receive the mounting hub therethrough. The method also includes coupling a mounting bracket to the mounting hub such that the mounting bracket is positioned within the terminal box and such that the baseplate is positioned between the mounting bracket and the adaptor. The method further includes selectively engaging the base plate with at least one fastener that is inserted through an opening in the mounting bracket to compress the terminal box and the adaptor together, wherein engaging the baseplate prevents rotation of the terminal box relative to the adaptor and to seal an interior of the terminal box and the adaptor from an exterior environment.

DETAILED DESCRIPTION

The embodiments described herein relate to a terminal box assembly for use with an electric motor assembly and methods of assembling the same. The terminal box assembly is fully sealed to prevent debris collection and moisture ingress between the terminal box assembly and motor housing while still maintaining lead access opening orientation flexibility. Specifically, the embodiments relate to a terminal box assembly that includes an adaptor fixedly coupled to the motor housing and a terminal box that is selectively rotatably coupled to the adaptor. The cylindrical adaptor mates with the terminal box to seal an interior of the terminal box assembly from debris and moisture. As such, the adaptor prevents ingress and accumulation of debris and also provides an easily cleaned surface devoid of gaps and crevices where debris can congregate A mounting bracket and accompanying fasteners selectively secure the terminal box to the adaptor to seal the interior of the terminal box and adaptor from debris and moisture. More specifically, in order to provide compression to the O-ring seal between the adaptor and the terminal box, the mounting bracket engages with the mounting hub groove thereby capturing the closed end of the terminal box between the mounting bracket and the adaptor. The mounting bracket contains one or more fastener engagement acceptance means that are intended to accept the fasteners used to interface to the fastener acceptance engagement means in the closed end of the terminal box. As these fasteners are tightened, the O-ring sealed relationship between the terminal box and terminal box adaptor experiences compression which is necessary to prevent moisture ingress. When the mounting bracket and fasteners are loosened, that is, partially disengaged from the terminal box, the terminal box may then be rotated relative to the adaptor to allow a technician to position a lead access opening in the terminal box into a desired orientation. Arcuate slots formed in a baseplate of the terminal box allow the terminal box to be rotated without damaging lead wires that extend from the motor housing into and through the terminal box assembly. Accordingly, the present embodiments remove the debris collecting features in the current art while still allowing the installer to orient the lead access opening in the terminal box in any angular orientation.

Figure 1:
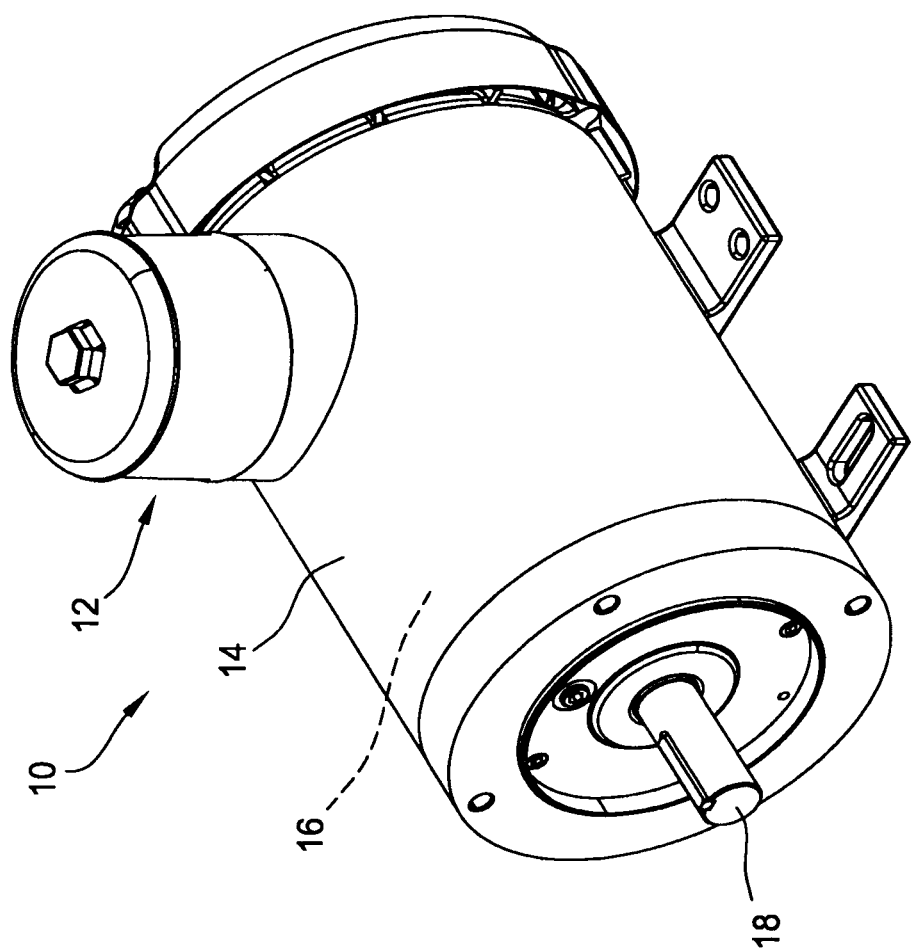
FIG. 1 is a perspective view of an exemplary electric motor assembly including an exemplary terminal box assembly.

FIG. 1 is a perspective view of an exemplary electric motor assembly 10 including an exemplary terminal box assembly 12. Motor assembly 10 includes a housing 14, a motor 16 positioned within housing 14, and a shaft 18 that is rotated by motor 16 and coupled to a load (not shown)

Figure 2:
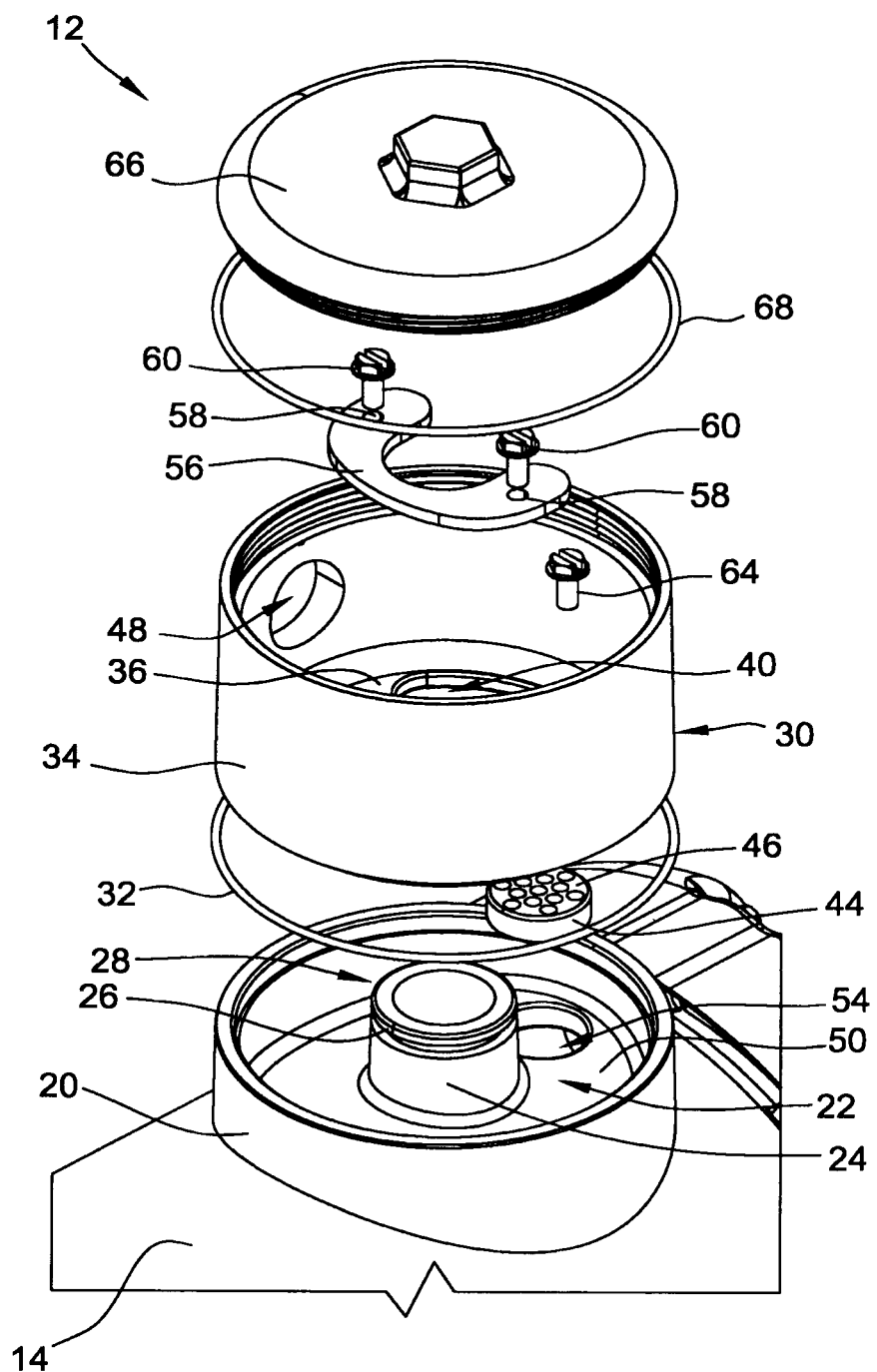
FIG. 2 is an exploded view of the exemplary terminal box assembly shown in FIG. 1.
Figure 3:
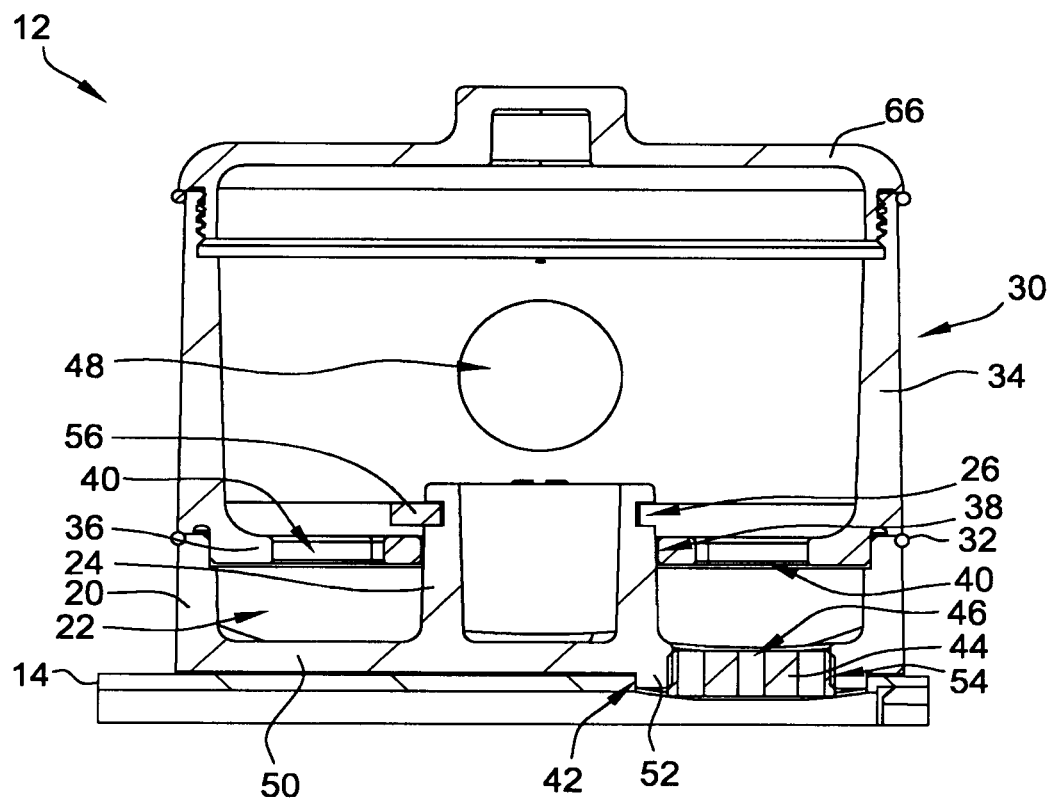
FIG. 3 is a side cross-sectional view of the exemplary terminal box assembly shown in FIG. 1.
Figure 4:
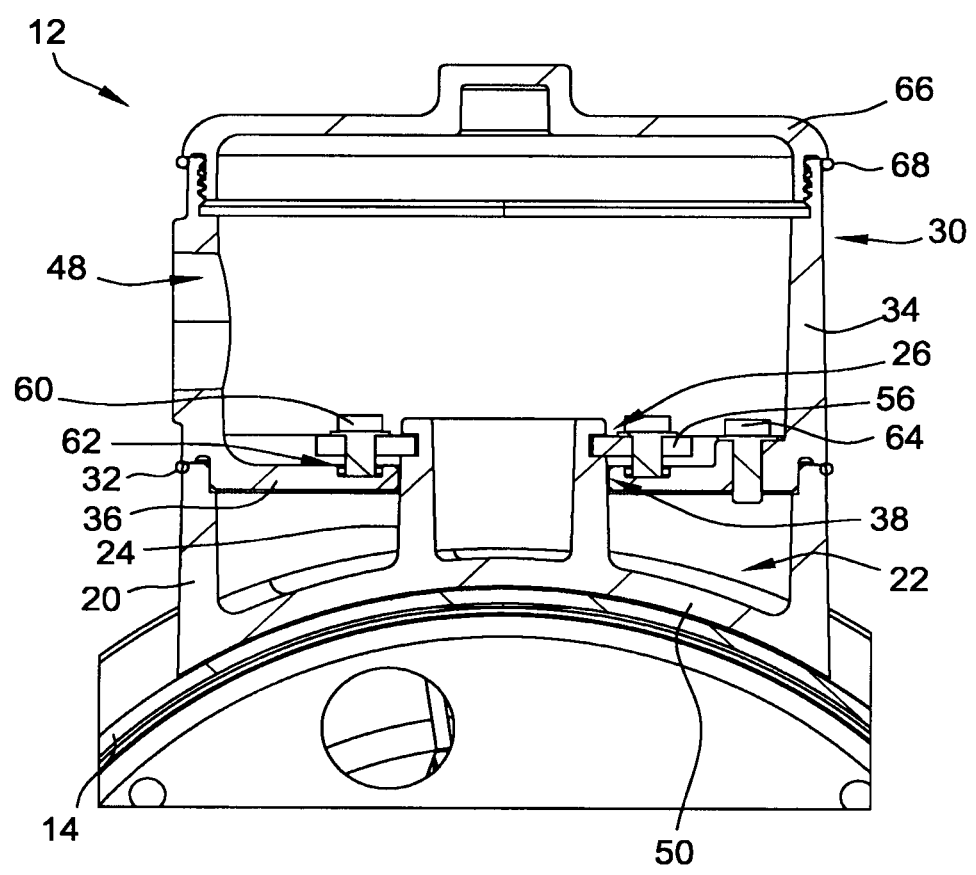
FIG. 4 is a front cross-sectional view of the exemplary terminal box assembly shown in FIG. 1.
Figure 5:
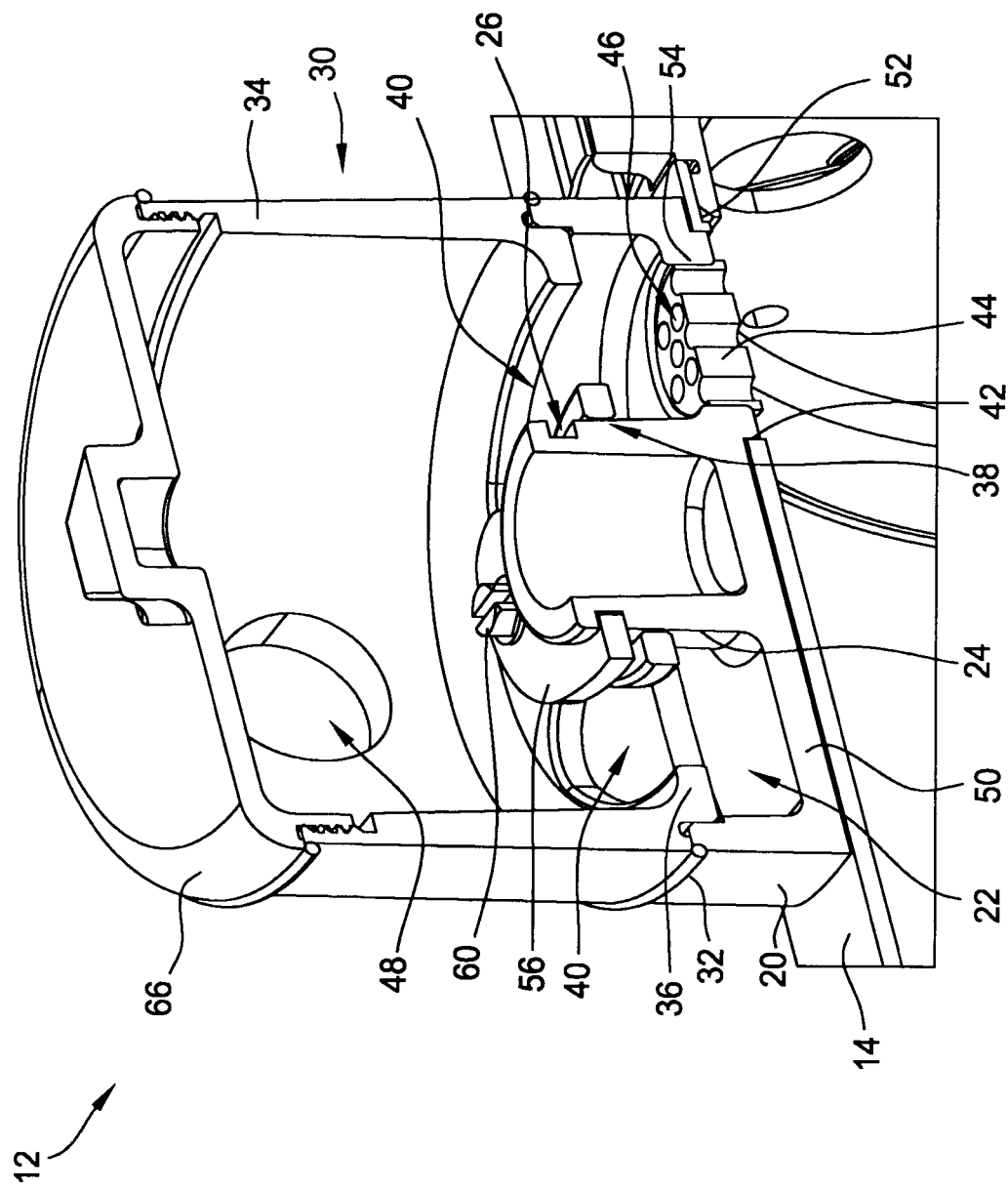
FIG. 5 is a perspective cross-sectional view of the exemplary terminal box assembly shown in FIG. 1.
Figure 6:
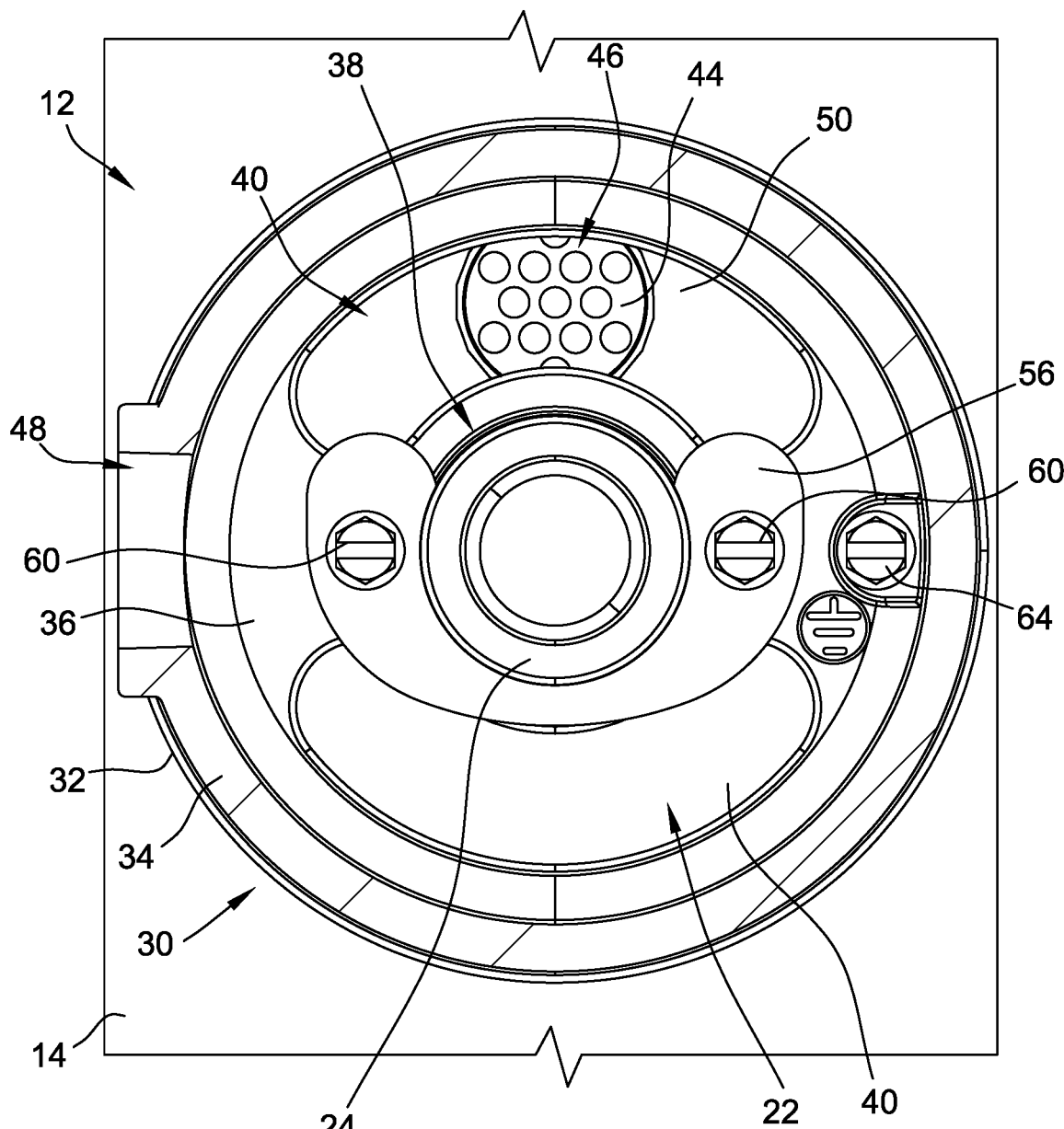
FIG. 6 is a top cross-sectional view of the exemplary terminal box assembly shown in FIG. 1.

FIG. 2 is an exploded view of terminal box assembly 12, FIG. 3 is a side cross-sectional view of terminal box assembly 12, FIG. 4 is a front cross-sectional view of terminal box assembly 12, FIG. 5 is a perspective cross-sectional view of terminal box assembly 12, and FIG. 6 is a top cross-sectional view of terminal box assembly 12.

In the exemplary embodiment, terminal box assembly 12 includes a terminal box adaptor 20 that is fixedly and permanently coupled to an exterior surface of housing 14. In one embodiment, adaptor 20 is welded to housing 14. In another embodiment, adaptor 20 is integrally formed with housing 14 as a single casting. Adaptor 20 is annular or circular in shape and defines an interior chamber 22. Fixedly coupling adaptor 20 to housing 14 seals interior 22 from an external environment to prevent debris from entering interior 22.

A mounting hub 24 extends from a base 50 of adaptor 20 and is positioned within a circumference of adaptor 20. More specifically, mounting hub 24 is positioned at a center of adaptor 20. Similar to adaptor 20, mounting hub 24 is one of welded or integrally formed with housing 14. In the exemplary embodiment, mounting hub 24 includes a circumferential groove 26 formed near a distal end 28 of mounting hub 24.

In the exemplary embodiment, an annular terminal box 30 is rotatably coupled to adaptor 20. Terminal box 30 and adaptor 20 are both annular, that is, circular, and define a substantially similar diameter such that terminal box 30 also defines interior chamber 22. A compressible O-ring 32 is positioned between terminal box 30 and adaptor 20 to allow rotation movement of terminal box 30 relative to adaptor 20, but also to seal interior chamber 22 from the external environment.

Terminal box 30 includes an annular wall 34 and a baseplate 36. In the exemplary embodiment baseplate 36 includes a central opening 38 that receives mounting hub 24 therethrough when terminal box 30 is coupled to adaptor 20. In the exemplary embodiment, baseplate 36 also includes a pair of lead slots 40 that at least partially circumscribe central opening 38. As best shown in FIG. 6, lead slots 40 are arcuate in shape to enable rotation of terminal box 30 relative to adaptor 20 while maintaining alignment of a portion of one of lead slots 40 with a housing lead opening 42 formed in housing 14. As such, arcuate lead slots 40 allow for mounting of terminal box 30 in multiple different orientations with respect to adaptor 20.

In the exemplary embodiment, terminal box assembly 12 includes a lead separator 44 that is positioned within lead opening 42 in housing 14 and includes a plurality of openings 46. More specifically, adaptor 20 includes a base 50 that includes a flange 52 that extends into lead opening 42. Flange 52 circumscribes an aperture 54 in base 50 into within lead separator 44 is positioned. Lead separator 44 maintains separation between the wire motor leads to eliminate the possibility of moisture ingress into housing 14 on the surface of the lead wires. In some embodiments, a sealing mechanism, such as an epoxy resin, is poured into adaptor 20 after the lead wires are threaded through lead separator 44 to seal openings 42 and 46 and aperture 54. Furthermore, annular wall 34 of terminal box 30 includes a lead access opening 48 defined therethrough. Rotation of terminal box 30 relative to adaptor 20 enables a technician to change the location of lead access opening 48 to a desired position.

In operation, lead wires from motor 16 extend through openings 46 in lead separator 44 and into chamber 22. The lead wires then pass through one of the arcuate slots 40 into terminal box 30 and through lead access opening 48 in annular wall 34. The arcuate shape of slots 40 allow rotation of terminal box 30 without damaging the lead wires.

In the exemplary embodiment, terminal box assembly 12 also includes a mounting bracket 56 coupled to mounting hub 24 and positioned within terminal box 30 such that baseplate 36 is positioned between mounting bracket 56 and adaptor 20. More specifically, mounting bracket 56 is coupled within groove 26 of mounting hub 24 such that groove 26 at least partially receives mounting bracket 56. In one embodiment, mounting bracket 56 is a C-shaped plate that partially circumscribes mounting hub 24. Alternatively, mounting bracket 56 can be any shape that facilitates operation of terminal box assembly 12 as described herein.

Mounting bracket 56 includes a pair of fastener openings 58 defined therethrough that each receive a fastener 60 of terminal box assembly 12. In the exemplary embodiment, fasteners 60 engage baseplate 36 to compress terminal box 30 and adaptor 20 together. More specifically, baseplate 36 includes a pair of indentations 62, as best shown in FIG. 4, that selectively engage with fasteners 60 to compress O-ring 32 and secure terminal box 30 and adaptor 20 together.

In operation, when fasteners 60 are tightened, their distal ends engage indentations 62 and push against baseplate 36 of terminal box 30 to compress O-ring 32 and secure terminal box 30 to adaptor 20. As such, when fasteners 60 are fully tightened and fully engaged with baseplate 36, terminal box 30 prevented from rotating relative to adaptor 20 and interior chamber 22 of terminal box 30 and adaptor 20 is sealed from the exterior environment. When fasteners 60 are at least partially disengaged from indentations 62 in baseplate 36, terminal box 30 is able to be rotated relative to adaptor 20 to allow a technician to position lead access opening 48 in any desired orientation.

In the exemplary embodiment, terminal box assembly 12 also includes a grounding mechanism 64 coupled to baseplate 36 for grounding a ground of the lead wires. Furthermore, a cover plate 66 is coupled to terminal box 30 opposite adaptor 20 and seals chamber 22. In one embodiment, cover plate 66 is threadably coupled to terminal box 30. Alternatively, cover plate 66 is coupled to terminal box 30 in any manner that facilitates operation of terminal box assembly 12 as described herein. Additionally, an O-ring 68 is coupled between cover plate 66 and terminal box 30 to seal chamber 22 from the external environment.

The embodiments described herein relate to a terminal box assembly for use with an electric motor assembly and methods of assembling the same. The terminal box assembly is fully sealed to prevent debris collection and moisture ingress between the terminal box assembly and motor housing while still maintaining lead access opening orientation flexibility. Specifically, the embodiments relate to a terminal box assembly that includes an adaptor fixedly coupled to the motor housing and a terminal box that is selectively rotatably coupled to the adaptor. The adaptor of the terminal box assembly is permanently fixed to the motor housing in a manner that is not intended to be manipulated or changed by a technician. The cylindrical adaptor mates with the terminal box to seal an interior of the terminal box assembly from debris and moisture. As such, the adaptor prevents ingress and accumulation of debris and also provides an easily cleaned surface devoid of gaps and crevices where debris can congregate A mounting bracket and accompanying fasteners selectively secure the terminal box to the adaptor to seal the interior of the terminal box and adaptor from debris and moisture. More specifically, in order to provide compression to the O-ring seal between the adaptor and the terminal box, the mounting bracket engages with the mounting hub groove thereby capturing the closed end of the terminal box between the mounting bracket and the adaptor. The mounting bracket contains one or more fastener engagement acceptance means that are intended to accept the fasteners used to interface to the fastener acceptance engagement means in the closed end of the terminal box. As these fasteners are tightened, the O-ring sealed relationship between the terminal box and terminal box adaptor experiences compression which is necessary to prevent moisture ingress. When the mounting bracket and fasteners are loosened, the terminal box may then be rotated relative to the adaptor to allow a technician to position a lead access opening in the terminal box into a desired orientation. Arcuate slots formed in a baseplate of the terminal box allow the terminal box to be rotated without damaging lead wires that extend from the motor housing into and through the terminal box assembly. Accordingly, the present embodiments remove the debris collecting features in the current art while still allowing the installer to orient the lead access opening in the terminal box in any angular orientation.

The methods and apparatus are not limited to the specific embodiments described herein, but rather, components of apparatus and/or steps of the methods may be utilized independently and separately from other components and/or steps described herein.

Exemplary embodiments of terminal box assemblies for electric motor assemblies are described above in detail. The terminal box assemblies and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A terminal box assembly for use with an electric motor assembly having a housing, said terminal box assembly comprising:
    an annular adaptor fixedly coupled to the housing, the adaptor having an annular exterior shape;
    a mounting hub extending from a base of said adaptor;
    an annular terminal box rotatably coupled to said adaptor, the terminal box having the annular exterior shape, said terminal box comprising a baseplate having a central opening defined therethrough and configured to receive said mounting hub therethrough, and said terminal box further comprising an annular outermost wall extending from the baseplate and defining the annular exterior shape of the terminal box;
    a mounting bracket coupled to said mounting hub and positioned within said terminal box such that said baseplate is positioned between said mounting bracket and said adaptor; and
    at least one fastener inserted through an opening in said mounting bracket and configured to selectively engage said baseplate to compress said terminal box and said adaptor together.

2. The terminal box assembly of claim 1, wherein at least partial disengagement of said at least one fastener from said baseplate is configured to enable rotation of said terminal box relative to said adaptor, and wherein full engagement of said at least one fastener with said baseplate is configured to prevent rotation of said terminal box relative to said adaptor and to seal an interior of said terminal box and said adaptor from an exterior environment.

3. The terminal box assembly of claim 1, wherein said annular adaptor is one of welded to or integrally formed with the housing.

4. The terminal box assembly of claim 1, wherein said adaptor and said terminal box are circular and define substantially similar diameters.

5. The terminal box assembly of claim 1, wherein said mounting hub comprises a circumferential groove configured to receive said mounting bracket.

6. The terminal box assembly of claim 1, further comprising a lead separator comprising a plurality of openings, said lead separator configured for insertion into an opening in the housing and positioned within said adaptor.

7. The terminal box assembly of claim 1, further comprising a compressible O-ring positioned between said adaptor and said terminal box.

8. The terminal box assembly of claim 1, wherein said baseplate comprises a pair of lead slots, wherein at least a portion of one slot is configured to align with an opening in the housing.

9. The terminal box assembly of claim 8, wherein said pair of lead slots are arcuate in shape to enable rotation of said terminal box while maintaining lead slot alignment with the housing opening.

10. The terminal box assembly of claim 1, wherein said annular outermost wall comprises a lead access opening defined therethrough.

11. The terminal box assembly of claim 1, wherein said baseplate comprises at least one indentation configured to engage with said at least one fastener, wherein said at least one fastener is configured to push against said indentation to press said terminal box toward said adaptor.

12. The terminal box assembly of claim 1, wherein said mounting bracket comprises a C-shaped plate.

13. A method of assembling a terminal box assembly for use with an electric motor assembly having a housing, said method comprising:

fixedly coupling an annular adaptor to the housing, wherein the adaptor includes a mounting hub extending therefrom and positioned within the adaptor, the adaptor having an annular shape;

rotatably coupling an annular terminal box to the adaptor, the terminal box including a baseplate having a central opening defined therethrough and configured to receive the mounting hub therethrough, the terminal box having the annular exterior shape, the terminal box further including an annular outermost wall extending from the baseplate and defining the annular exterior shape of the terminal box;

coupling a mounting bracket to the mounting hub such that the mounting bracket is positioned within the terminal box and such that the baseplate is positioned between the mounting bracket and the adaptor; and selectively engaging the baseplate with at least one fastener that is inserted through an opening in the mounting bracket to compress the terminal box and the adaptor together, wherein engaging the baseplate prevents rotation of the terminal box relative to the adaptor and to seal an interior of the terminal box and the adaptor from an exterior environment.

14. The method of claim 13, further comprising at least partially disengaging the at least one fastener from the baseplate to enable rotation of the terminal box relative to the adaptor.

15. The method of claim 13, wherein fixedly coupling the annular adaptor to the housing comprises one of welding or integrally forming the annular adaptor with the housing.

16. The method of claim 13, wherein coupling the mounting bracket to the mounting hub comprises positioning at least a portion of the mounting bracket within a circumferential groove defined near an end of the mounting hub.

17. The method of claim 13, further comprising:

forming a housing lead opening in the housing, wherein the housing lead opening is positioned within the adaptor; and positioning a lead separator within the housing lead opening, wherein the lead separator includes a plurality of openings.

18. The method of claim 17, further comprising aligning a portion of one of a pair of arcuate lead slots formed in the baseplate with the housing lead opening and the lead separator.

19. The method of claim 18, wherein the aligning step comprises rotating the terminal box relative to the adaptor when the at least one fastener is at least partially disengaged from the baseplate to align the portion of one of the pair of arcuate lead slots with the lead separator.

20. The method of claim 13, wherein selectively engaging the baseplate with the at least one fastener comprises selectively engaging at least one indentation formed in the baseplate with the at least one fastener such that the at least one fastener is configured to push against the indentation to press the terminal box toward the adaptor.

* * * * *